May 27, 1958 R. SEYFARTH 2,836,113
HEATING AND VENTILATING SYSTEM OR APPARATUS FOR VEHICLES
Filed Nov. 18, 1953 5 Sheets-Sheet 1

INVENTOR
Robert Seyfarth
BY C. F. Dibble
ATTORNEY

May 27, 1958 R. SEYFARTH 2,836,113
HEATING AND VENTILATING SYSTEM OR APPARATUS FOR VEHICLES
Filed Nov. 18, 1953 5 Sheets-Sheet 2

INVENTOR
Robert Seyfarth
BY C. H. Dibbe
ATTORNEY

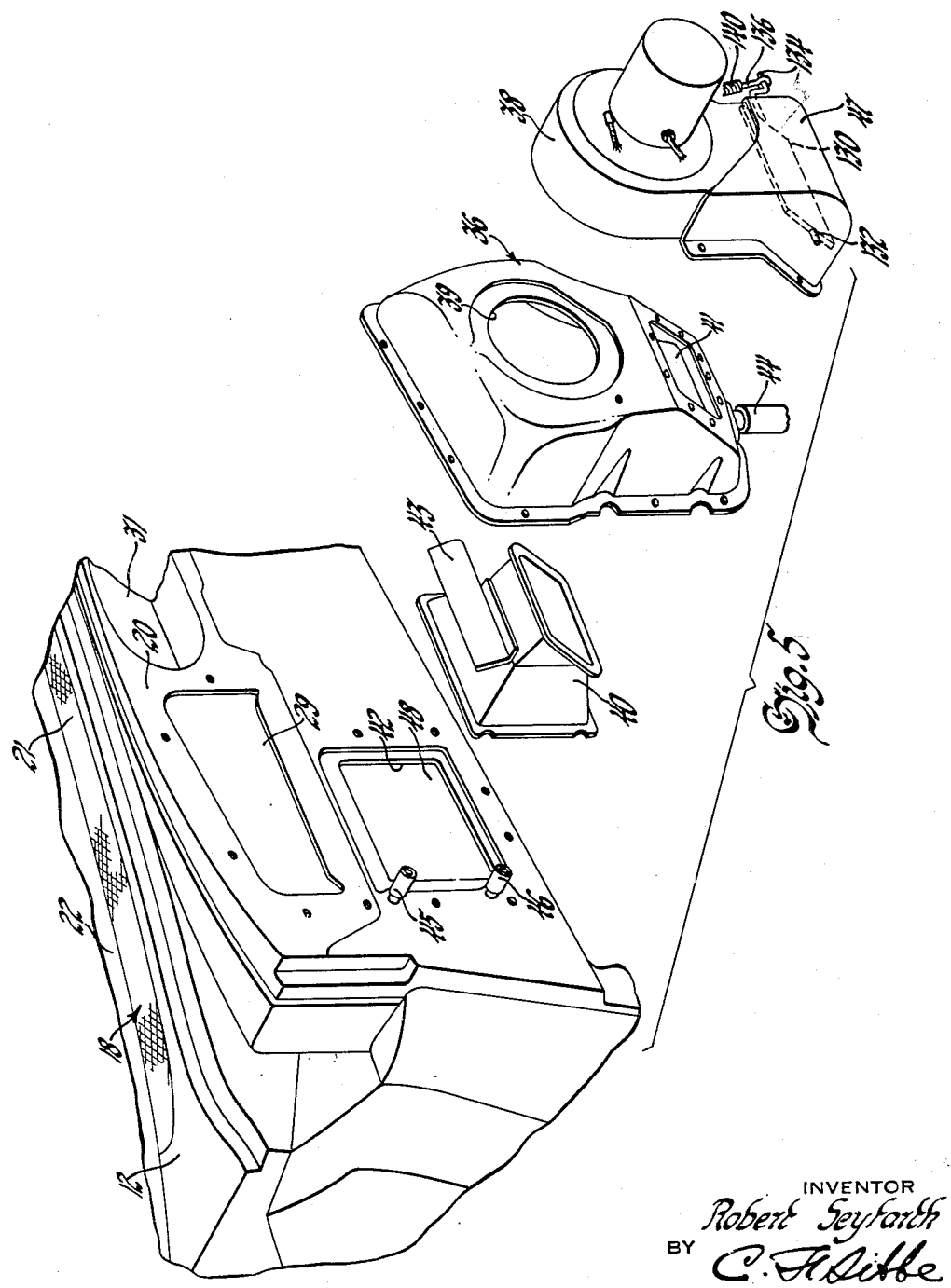

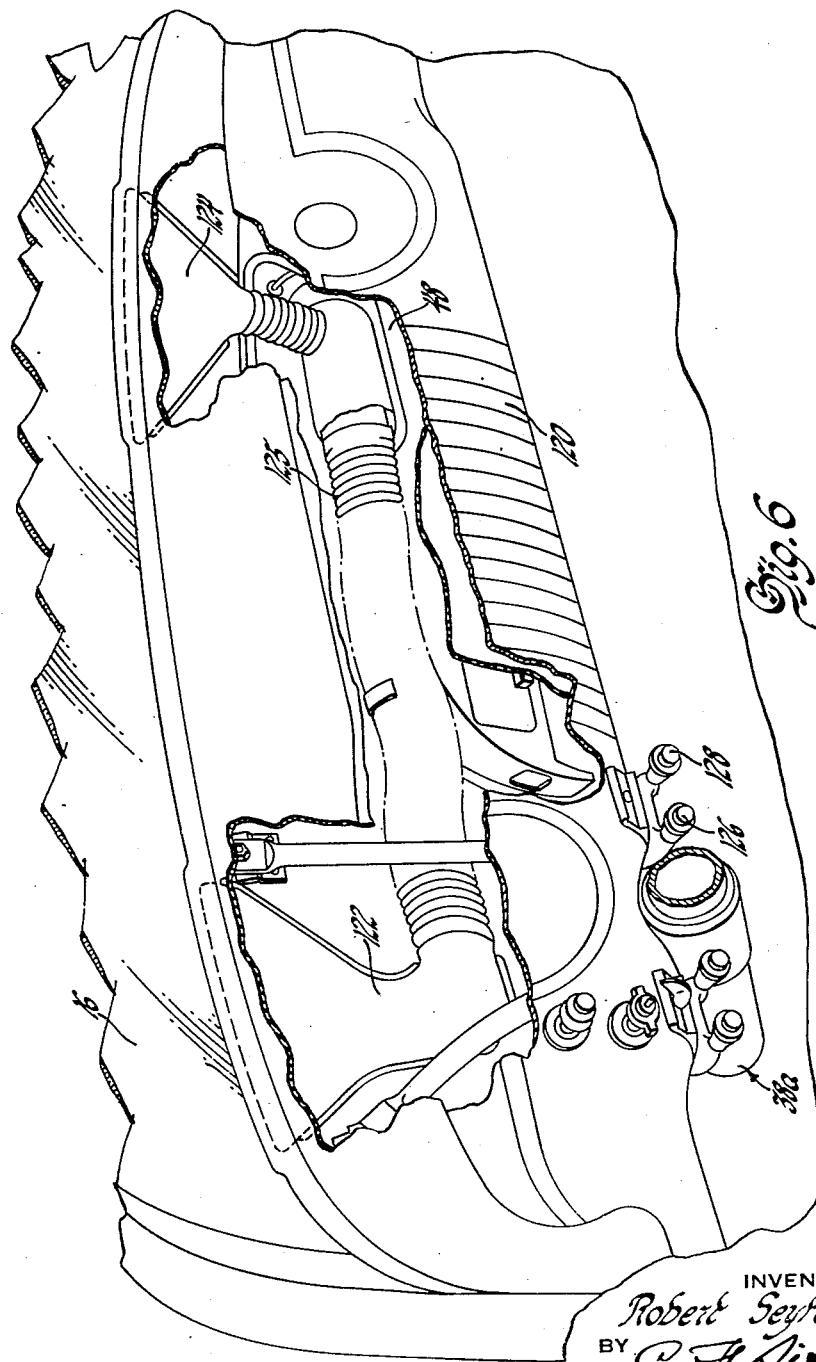

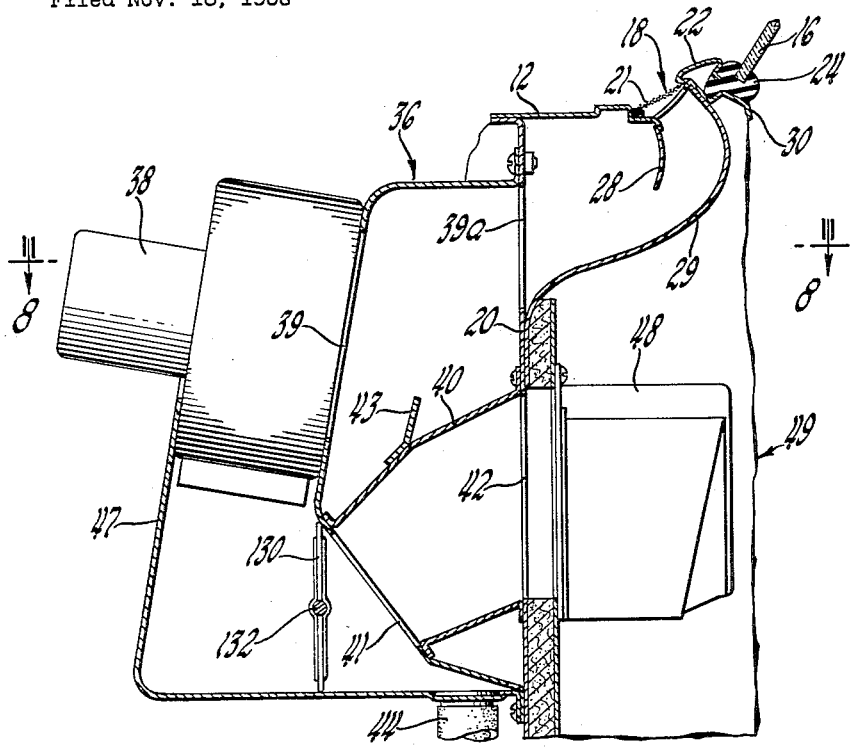

United States Patent Office 2,836,113
Patented May 27, 1958

2,836,113

HEATING AND VENTILATING SYSTEM OR APPARATUS FOR VEHICLES

Robert Seyfarth, Mason, Mich., assignor to General Motors Corporation, Detroit, Mich., a corporation of Delaware Application November 18, 1953, Serial No. 392,823

5 Claims. (Cl. 98—2)

This invention relates to heating and ventilating systems or apparatuses for vehicles and more particularly to an improved heating and ventilating system or apparatus arranged in cooperative relation with a cowl and fire wall of an automotive vehicle.

In modern automobiles it is highly advantageous to admit controlled but large volumes of air for adequate ventillation consistent with proper heating. This requires an adequate inlet for the air which must be clear of obstructions such as snow or ice. For aesthetic as well as more practical reasons it is advisable to screen the inlet and if the latter is located at the most advantageous place, which is along and near the base of the windshield, the screen is subject to clogging by snow and ice particularly under severe weather conditions. Blockage of the air inlet obviously would impair the effectiveness of the system which is largely dependent upon the admission of fresh air.

It now has been found that blockage of the air inlet may be prevented or eliminated by the use of the improved heating and ventilating apparatus of the present invention. As the sizes of the air inlets in modern cars are increased to secure the desired and more adequate ventilation, such increase does not militate against the effectiveness of the apparatus in which the present invention is embodied. It has also been found that the inlet clearing feature may be combined with a duct system integral with a vehicle body to produce an effective and advantageous heating and ventilating system.

It is an object of the present invention to provide an improved heating and ventilating system which automatically will "defrost" or remove ice and snow from the ventilating system air inlet in the cowl of a vehicle.

Another object of the invention is to provide a heating and ventilating apparatus for a vehicle, the normal operation of which is automatically resumed when an obstruction to the air inlet is removed.

Another object is to provide an improved duct system for heating and ventilating which automatically may be cleared of snow and ice and which is compact and effective during normal operation.

A feature of the invention resides in a vehicle cowl, a duct leading from the cowl to the passenger compartment of the vehicle, a fan means for forcing air from the duct into the compartment, means for heating the air and a one-way valve for admitting air from the compartment into the duct.

Another feature is an air recirculating system arranged to force heated air along and substantially parallel with an elongated air inlet in a vehicle cowl.

Another feature of the invention is an S-shaped duct leading downwardly from the cowl of a vehicle to a compartment thereof in combination with a yielding one-way valve for admitting air from the compartment into the duct.

Another feature is an air inlet extending substantially the width of the cowl and serving as an air scoop to a duct system employing two downwardly extending housing or curved ducts with one of the ducts adapted to conduct air directly to the passenger compartment through a suitable opening in the vehicle fire wall and the other having a fan for inducing air flow to a heater.

These and other important features of the invention will now be described in detail in the specification and then pointed out more particularly in the appended claims.

In the drawings:

Fig. 5 is an exploded, perspective view of an assembly shown in Fig. 1;

Fig. 6 is a perspective view of a portion of an instrument panel with portions broken away;

Fig. 7 is an enlarged sectional view taken along the line 7—7 in Fig. 1; and

Fig. 8 is a sectional view taken along the line 8—8 in Fig. 7.

Figure 1:
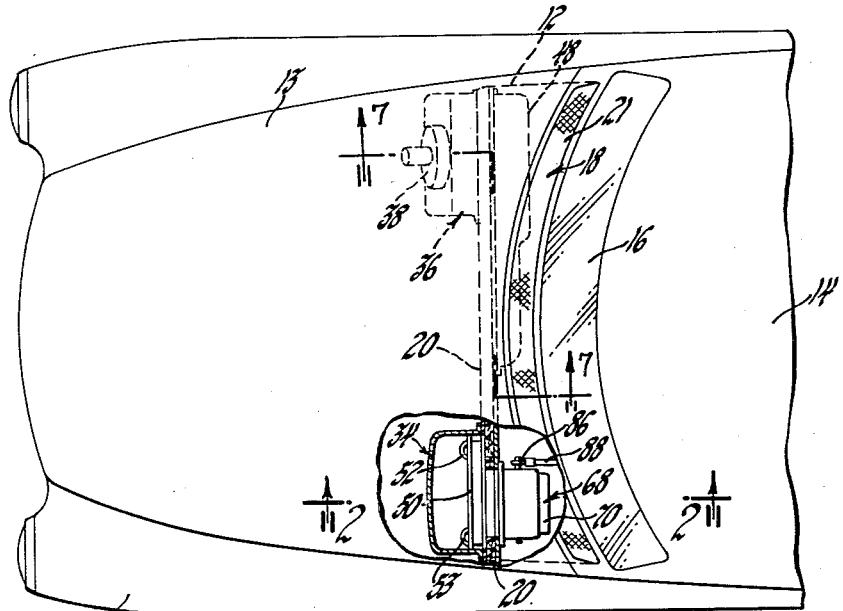
Fig. 1 is a plan view of the front half of an automotive vehicle, parts being broken away for clarity of illustration.

Fig. 1 shows an automotive vehicle 10 having a cowl 12, a hood 13, a top 14, a windshield 16 and an elongated and screened inlet opening 18 provided in the cowl adjacent to the base of the windshield.

The vehicle 10 is provided with a vertical fire wall 20 which divides the body thereof into an engine compartment and a passenger compartment. The rearmost and top portion of the cowl 12 conforms with the base of the windshield 16 and has provided thereon a trim strip 22 to which is joined a rubber strip 24 for retaining the lower edge of the windshield. Depending sheet metal structures 28 and 29 are secured to the lower side of the cowl and define a wide and transversely curved throat portion for air admitted at the inlet 18. This inlet and the throat portion extend substantially the width of the windshield. The structure 28 is a plate formed in an arc which is concentric with the plate structure 29, the latter being of substantially S-shaped construction and which merges with the fire wall 20 at two spaced areas as more fully explained hereinafter. A flange 30 is provided on the trim strip 22 to reinforce the latter. The inlet 18 is provided with an ornamental screen 21 which prevents entry of foreign objects such as insects.

An intermediate portion of the wall 20 is recessed as at 31 (Figs. 2, 5 and 8) to accommodate a windshield wiper motor (not shown) so that the latter is accessible from the engine compartment. Above recess 31 and partially defining it is a downwardly and rearwardly extending wall 31a (Fig. 2) which also partially defines a transverse horizontal duct 31b. The wall 29 curves downwardly and merges with the wall 20 at each end of the duct 31b at the two spaced areas heretofore mentioned and thereby forms a portion of one of the walls of each of two substantially S-shaped ducts generally indicated at 34 and 36. It will be noted that the duct 36 is fitted with a fan 38 the inlet of which is arranged, as clearly shown in Fig. 5, to communicate with the interior of the duct through a circular opening 39. Outside air is admitted to the duct 36 through an opening 39a (Fig. 7) in the fire wall 20. The duct 34 on the left-hand side of the vehicle is shown without a fan housing but it is to be understood that a fan may be employed on both sides of the car if found to be desirable.

From the above it may be seen that the wall 29 at each of the ducts 34 and 36 aids to define a downwardly extending S-shaped duct and that the two ducts are joined by the horizontal duct 31b. It is also clear that the ends of the duct 31b are determined by the cowl structure. Fig. 5 illustrates how the cowl structure is formed at the right side of the vehicle.

Conveniently, the fan 38 may have its outlet (Fig. 5) joined to a heater 48 arranged on the passenger side of the fire wall 20. This heater installation may be of the type disclosed in the United States Patent Number 2,684,620, issued July 27, 1954, in the name of Harold J. Schoelles. Air thus may be taken from the duct 36, forced through the fan 38 and heater 48 and into the passenger compartment 49. A control means 38a (Fig. 6) is used in operation of the switch for the motor 38 and the heater 48. Communication through the duct 36 to the heater 48 is had by means of a box-like duct member 40 having open ends which are joined respectively to the lower end of duct 36 around the margin of an opening 41 therein, and to the marginal portion of the wall 20 around an opening 42. An upstanding flange 43 is joined to the top of the member 40 to conduct water to a drain connection 44. Hose connections 45 and 46 are provided for circulating hot water from the vehicle engine and through the core of the heater 48. An L-shaped duct 47 extends from the housing of the fan 38 and the outlet end thereof is secured to the lower portion of duct 36 in alignment with opening 41.

Control of the air flow to the heater 48 is accomplished by a butterfly valve 130 (Fig. 5) pivotally mounted in the lower end of duct 47. This valve is actuated by a shaft 132 on which the valve is mounted and a crank 134 to which a Bowden wire 136 is pivotally attached. The wire 136 is guided by a conduit 140 leading up to the instrument panel 120.

An inverted U-shaped trough 50 is provided on the rearward wall of the duct 34 which conducts the water collected therein to hose drain connections 52 and 53.

Built-in duct structures on the order of ducts 34 and 36 are disclosed in the application for United States Letters Patent Serial Number 392,806 filed November 18, 1953, in the names of James D. Leslie, Robert M. Fox and Lloyd E. Muller and entitled, "Vehicle Body With Built-In Ventilation System," now Patent No. 2,807,201 and to which reference may be had for a more complete description thereof.

Within the passenger compartment 49 and secured on the wall 20 by means of brackets 55 in alignment with an opening 64 in the wall 20 is a valve housing 68 having a rearwardly directed arcuate wall 70. A butterfly valve member 72 is mounted in housing 68 on a shaft 74 which is journaled in the opposite sides 76 and 78 of the housing. A flexible seal strip 79 is suitably held within recesses along the perimeter of the valve member 72 yieldingly to engage the four interior sides of the casing 68 in air tight manner upon closure of the valve. The valve member 72 is composed of two plates 80 and 82 which, when joined together by welding, are so formed or beaded as to clamp over the shaft 74 and to provide the marginal recesses into which the rubber strip material 79 is retained. The shaft 74 is extended at one end to form a crank 86 to which an actuating member 88 is pivotally attached. The member 88 is in the form of a Bowden wire guided within a conduit 90. The end of the conduit 90 is held in fixed relation with the valve casing 68 by means of a suitable clamp 92. It will be understood that the Bowden wire 88 may be operated manually for opening or closing the valve 72. Stop members 87 and 89 are provided on the side 76 of the casing 68 to determine the fully open and closed positions respectively of the valve 72.

The lower half of the valve member 72 is provided with two openings 94 and 96 which extend through both plates 80 and 82. On the duct side of the valve member 72 and just above the openings 94 and 96 the upper margin of a flexible and yielding flap member 100 is attached by means of screws 102 and 104. Interposed between the heads of the screws 102 and 104 and the flap member 100 is a metal strip 106. The flap member 100 hangs downwardly and covers the openings 94 and 96 normally to close the same.

Casing 68 has secured to the lower outer portion thereof a substantially V-shaped extension 110. Extension 110 communicates with the bottom half of the casing 68 and has an opening 112 in the upper wall 112a and two downwardly directed openings 114 and 116 in the lower wall 112b.

Fig. 6 depicts an instrument panel 120 with two defroster nozzles 122 and 124 connected to the heater 48 by branch connections indicated at 125. Manually operable control knobs 126 and 128 are also mounted on the instrument panel 120 for the manipulation of Bowden wires 88 and 136, respectively, previously mentioned. Heater and fan motor controls 38a have been referred to.

Operation of the system or apparatus may be understood from the above description of the construction but in order to avoid any misunderstanding it may be stated that in cold weather and during normal operation, the butterfly valve 72 at the left front portion of the compartment 49 may be closed by pushing the knob 126 (Fig. 6) forwardly. This results in cutting off the supply of cold air. Use of the knob 128 is then employed in the opening of the valve 130 and air may then enter through the cowl inlet 18 to be forced by the fan 38 through the ducts provided to the heater 48 and then into the passenger compartment 49.

In warm weather either or both of valves 72 and 130 may be opened for ventilation. The temperature of the heater 48 may be reduced by suitable temperature control apparatus not disclosed so that air from the fan 38 will not be overheated. The V-shaped member or extension 110 directs air upwardly by way of the opening 112 and also downwardly by way of the openings 114 and 116 into the left-hand forward end of the compartment 49.

Figure 2:
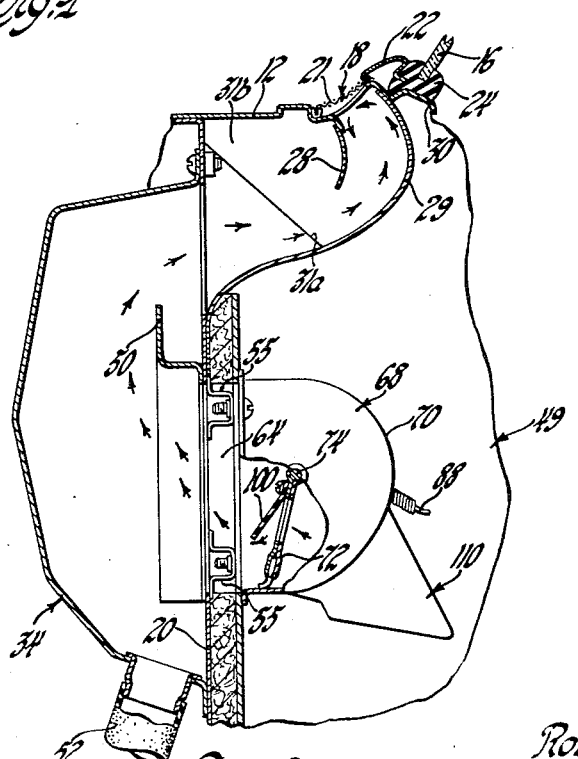
Fig. 2 is an enlarged elevational view, partly in section, taken substantially along the line 2—2 of Fig. 1.
Figure 3:
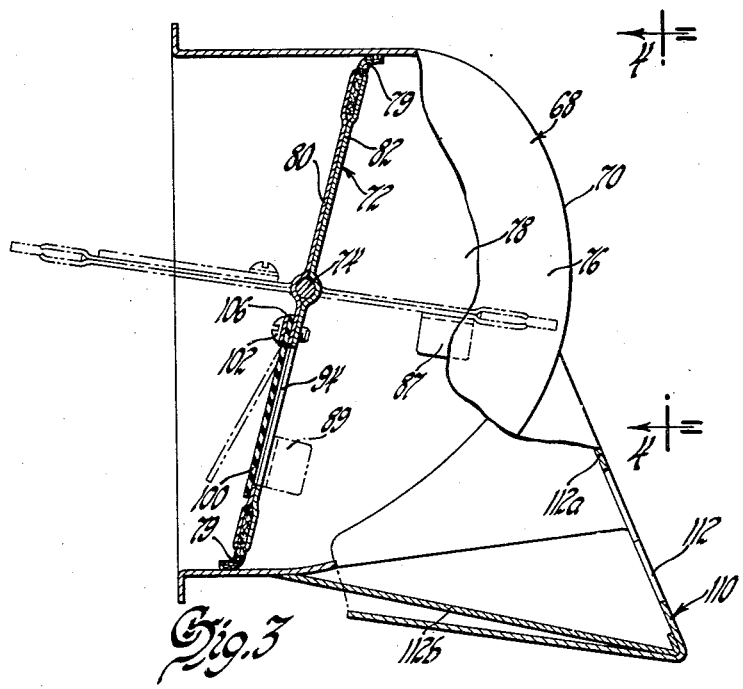
Fig. 3 is an enlarged view, with parts broken away, of a valve casing shown in Fig. 2.
Figure 4:
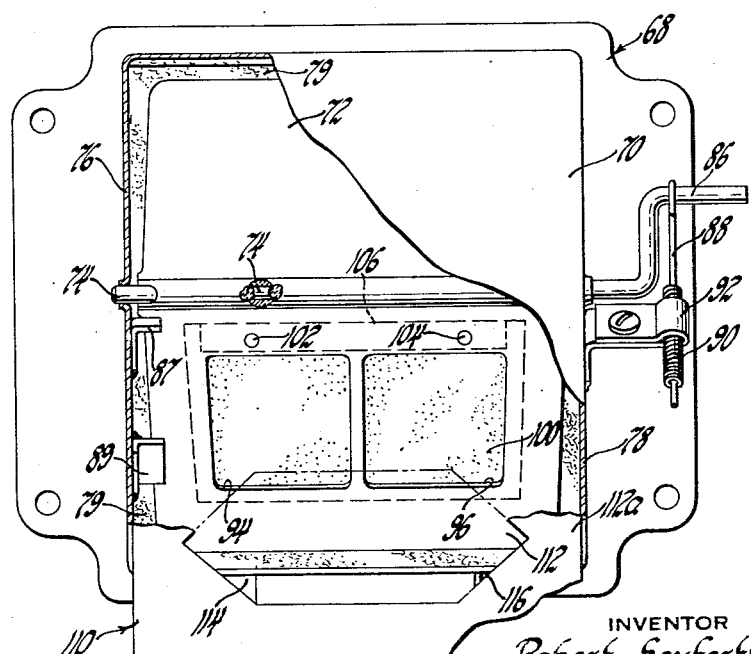
Fig. 4 is an elevation view of the valve casing shown in Fig. 3 with parts broken away for clarity of illustration.

Assuming that the automotive vehicle 10 has been inoperative or the heating system has not been used for some time and snow or ice has blocked the air inlet, the heating system will, nevertheless, be operative and effective by air recirculation as soon as the warming-up period of the vehicle motor has expired. The ventilation system, however, remains temporarily inoperative due to the snow blockage of the inlet 18. During this period, the fan 38 will draw air from the ducts 34, 31b and 36 and force the same through the heater 48 into the compartment 49. As a result the air pressure in the compartment 49 will exceed that within the ducts 34 and 36 and this pressure will cause the yielding flap element 100 to swing upwardly into the position as shown in Fig. 2 thereby permitting recirculation of heated air from the vehicle compartment 49 to the ducts 34, 31b and 36 as a subnormal operation. These ducts, being thus generally heated, will cause prompt defrosting or deicing of the deposits present on the screen 21 of the inlet 18. Removal of the deposits automatically restores normal operation of the ventilating system because of the equalization of air pressure on the opposite sides of the valve member 72 which causes the flap member 100 to close.

During the subnormal operation—i. e.—when the inlet 18 of the cowl is blocked with snow or ice—the action of the yieldable valve 100 is automatic and the knobs 126 and 128 need not be moved from their normal cold weather positions.

I claim:

1. Heating and ventilating apparatus for a motor vehicle having a windshield, said apparatus including S-shaped duct means extending downwardly for the admission of outside air, an inlet transverse to the upper end of said duct means and forward of said windshield, an outlet transverse to the lower end of said duct means and leading into a compartment of said vehicle, a valve positioned to control said outlet, said valve being in the form of a pivoted flat member, an opening leading through said flat member, a yielding flap element mounted on the duct means side of said flat member to control said opening, and means independent of said outlet for forcing air from said duct means into said compartment.

2. Heating and ventilating apparatus for a motor vehicle including a cowl, passenger compartment, and a fire wall, duct means with an S-shaped configuration having an air inlet in said cowl rearwardly of said fire wall and an air outlet leading rearwardly through said fire wall, means independent of said air outlet and including a fan and heater for drawing heated air from said duct means and supplying it to said compartment at the discharge side of said duct means, a valve casing in communication with said outlet and said compartment, a flat valve member pivoted in said valve casing to control said outlet, an opening in said valve member, and a flap member of rubber-like material yieldably mounted on the duct means side of said valve member at least partially to clear said opening when influenced by air pressure within said compartment.

3. A heating and ventilating system for a vehicle having a cowl, windshield and passenger compartment, said system including an elongated air inlet in said cowl and extending along the base of said windshield, duct means arranged normally to receive air from said inlet, a heater with an air inlet connected to said duct means and an air outlet communicating with said compartment, means including a fan for withdrawing air from said duct means near one end of said elongated inlet and forcing it through said heater to said compartment, means connecting the latter to said duct means and including a normally closed one-way pressure actuated valve for conducting air under abnormal conditions from said compartment to said duct means near the other end of said inlet, and the arrangement being such that abnormal blockage of said inlet will effect an increase of air pressure in said compartment by said fan and cause recirculation of heated air along and beneath said air inlet.

4. A heating and ventilating system for a vehicle including a passenger compartment and a cowl with an elongated air inlet for normal admission of air, duct means connected to the full length of said inlet and having extensions in the form of two spaced downwardly extending housings, a fan and heater connected in series with said duct means and compartment and associated with one of said housings and arranged normally to force ambient air from said inlet to said compartment to heat the latter, a port connecting the said compartment to the other of said housings, a normally closed one-way pressure actuated valve controlling said port, means connected with each of said housings for removing moisture from the system, and the arrangement being such that abnormal blockage of said inlet will cause said fan to recirculate heated air from said compartment and pass the latter along the length of said inlet.

5. A heating and ventilating system for a vehicle including a passenger compartment, windshield and a cowl, said system including an elongated inlet in said cowl for ambient air extending along the base of said windshield, duct means communicating directly with the full length of said inlet and having two spaced housings extending therefrom, a drain connected to each of said housings, a fan and heater with an air inlet associated with one of said housings and an air outlet directed to said compartment, said fan being arranged normally to direct heated air from said elongated inlet to said compartment, pressure actuated means arranged for admitting air under abnormal conditions from said compartment to the other of said housings, and the arrangement being such that abnormal blockage of said air inlet enables said fan to increase the pressure in said compartment and recirculate air through said compartment and duct means by actuating said pressure actuated means and cause the air to flow in the area of said air inlet to clear the latter for subsequent normal operation.

References Cited in the file of this patent

UNITED STATES PATENTS

| 1,040,730 | Moore | Oct. 8, 1912 |
| 2,045,578 | Buford | June 30, 1936 |
| 2,101,315 | Kemp | Dec. 7, 1937 |
| 2,203,477 | Wahlberg | June 4, 1940 |
| 2,235,642 | Lintern et al. | Mar. 18, 1941 |
| 2,237,477 | Colvin | Apr. 8, 1941 |
| 2,306,796 | Staley et al. | Dec. 29, 1942 |
| 2,510,790 | Arnold | June 6, 1950 |
| 2,612,829 | Joyce | Oct. 7, 1952 |
| 613,985 | Ulrich | Oct. 14, 1952 |

FOREIGN PATENTS

| 457,964 | Great Britain | Dec. 9, 1936 |